US011438387B2

(12) United States Patent
Lopez et al.

(10) Patent No.: US 11,438,387 B2
(45) Date of Patent: Sep. 6, 2022

(54) ACCESS MANAGEMENT SYSTEM WITH A SECURITY MAINTENANCE MANAGER

(71) Applicant: MICROSOFT TECHNOLOGY LICENSING, LLC, Redmond, WA (US)

(72) Inventors: Yanelis Lopez, Redmond, WA (US); Krupa Ravinath Tadepalli, Redmond, WA (US); Varun Sharma, Sammamish, WA (US); Johnathon Paul Mohr, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 367 days.

(21) Appl. No.: 16/659,413

(22) Filed: Oct. 21, 2019

(65) Prior Publication Data
US 2021/0120042 A1 Apr. 22, 2021

(51) Int. Cl.
*G06F 7/04* (2006.01)
*G06F 15/16* (2006.01)
*G06F 17/30* (2006.01)
*H04L 29/06* (2006.01)
*H04L 9/40* (2022.01)
*H04L 41/0816* (2022.01)

(52) U.S. Cl.
CPC ........ *H04L 63/205* (2013.01); *H04L 41/0816* (2013.01); *H04L 63/0236* (2013.01); *H04L 63/0263* (2013.01); *H04L 63/102* (2013.01)

(58) Field of Classification Search
CPC .............. H04L 63/205; H04L 41/0816; H04L 63/0236; H04L 63/0263; H04L 63/102; H04L 41/0893; H04L 41/0866
See application file for complete search history.

(56) References Cited

U.S. PATENT DOCUMENTS

| 6,237,007 B1 * | 5/2001 | Brown ............... G06F 30/33 716/107 |
| 8,392,997 B2 | 3/2013 | Chen et al. |

(Continued)

OTHER PUBLICATIONS

Chapas, et al., "Securing Industrial Control Systems through Autonomous Hardening", In Proceedings of the 2nd International Symposium for ICS & SCADA Cyber Security Research, Sep. 11, 2014, pp. 15-24.

(Continued)

*Primary Examiner* — Amie C. Lin
(74) *Attorney, Agent, or Firm* — Shook, Hardy & Bacon L.L.P.

(57) ABSTRACT

Methods, systems, and computer storage media for providing detection of unsecure network policies in a network segment and automatically remediating the unsecure policies based on pre-defined network policies in a computing environment. In particular, a security maintenance manager of an access management system in the computing environment detects an unsecure network policy based on comparing an active configuration of the network segment to an expected configuration of the network segment and modifies the active configuration to at least restore restrictions of network policies of the expected configuration to the active configuration. In operation, the security maintenance manager periodically accesses an active configuration record for the network segment and compares the active configuration record to an expected configuration record for the network segment. Based on comparing the active configuration record to the expected configuration record, restrictions are remediated (e.g., modified or added) to restore restrictions of the expected configuration record.

20 Claims, 7 Drawing Sheets

(56) References Cited

U.S. PATENT DOCUMENTS

| | | | |
|---|---|---|---|
| 9,489,517 B2 | 11/2016 | Murthy | |
| 2013/0074066 A1* | 3/2013 | Sanzgiri | H04L 41/0893 718/1 |
| 2016/0360557 A1* | 12/2016 | Lavi | H04L 67/141 |
| 2017/0118173 A1* | 4/2017 | Arramreddy | H04L 63/20 |
| 2019/0081854 A1* | 3/2019 | Pham | H04L 63/02 |
| 2020/0153758 A1* | 5/2020 | Kashyap | H04L 49/30 |

OTHER PUBLICATIONS

Davis, Ian, "Linux Server Hardening and Security Verification", Retrieved from https://www.ibm.com/developerworks/library/l-server-hardening/index.html, Aug. 17, 2016, 4 Pages.

Kassner, Michael, "3 Ways to Minimize Cyberattack Threats by Reducing Attack Surfaces", Retrieved from https://www.techrepublic.com/article/3-ways-to-minimize-cyberattack-threats-by-reducing-attack-surfaces/, Apr. 27, 2018, 10 Pages.

Miller, Sandra Kay., "Five Ways to Harden Windows Server", Retrieved from https://www.computerweekly.com/news/2240020779/Five-ways-to-harden-Windows-Server, Aug. 5, 2008, 4 Pages.

Obermeier, et al., "Automatic Attack Surface Reduction in Next-Generation Industrial Control Systems", In Proceedings of IEEE Symposium on Computational Intelligence in Cyber Security, Dec. 9, 2014, 8 Pages.

Smith, Travis, "20 CIS Controls: Control 12—Boundary Defense", Retrieved from https://www.tripwire.com/state-of-security/security-data-protection/20-critical-security-controls-control-12-boundary-defense/, Apr. 5, 2018, 6 Pages.

* cited by examiner

ACCESS MANAGEMENT SYSTEM WITH A SECURITY MAINTENANCE MANAGER

BACKGROUND

Users often rely on computing resources such as applications and services to perform various computing tasks. Distributed computing environments can support building, deploying, and managing applications and services. Users and enterprises are moving away from traditional computing environments to run their applications and services on distributed computing environments. Distributed computing environments implement security mechanisms (e.g., access management system with access control manager with network policies) to ensure the security of different types of computing resources in the distributed computing environments.

By way of example, an access management system with an access control manager is a critical mechanism that supports protecting access to resources in a distributed computing environment. The access control manager can specifically implement network policies that include network access ports that may be open, closed, or restricted to traffic. Changes that affect the network segment (e.g., new access resources, adding virtual machines, or security policies) can result in an increased security risk for distributed computing environment providers in that altering or violating existing access policies exposes the distributed computing environment to malicious users. Manually maintaining network access policies for changes that affect networks in distributed computing environment generates a significant workload for access management teams and network administrators. As distributed computing environments increasingly support applications and services, it is important to maintain a secure network while minimizing administrative workloads for computing resources in distributed computing environments.

SUMMARY

Various aspects of the technology described herein are generally directed to systems, methods, and computer storage media, for among other things, providing detection of unsecure network policies (e.g., network security groups "NSG") in a network segment (e.g., subnet having a virtual network firewall) and automatically remediating the unsecure policies based on pre-defined network policies in a distributed computing environment ("computing environment"). In particular, a security maintenance manager of an access management system in the computing environment detects an unsecure network policy based on comparing an active configuration (e.g., active configuration record) of the network segment to an expected configuration (e.g., expected configuration record) of the network segment. The security maintenance manager then modifies the active configuration to at least restore network policies of the expected configuration to the active configuration. For example, an active configuration record of a subnet may allow network traffic through port 22 and port 33 if the network traffic is transmitted via a Transmission Control Protocol (TCP) or User Data Protocol (UDP) and the network traffic is from a given IP range. However, an expected configuration record may indicate that the network traffic should be allowed on port 22, but not port 33. The security maintenance manager periodically compares the active configuration record to the expected configuration and then automatically, based on a set of restrictions rules, restricts port 33 to no longer allow network traffic, thus aligning the active configuration record to the expected configuration record.

In operation, the security maintenance manager (e.g., a cleanup service) running in a subscription environment accesses (e.g., periodically) an active configuration record (e.g., network security groups for a subscription) for a network segment. The active configuration record can include network policies on a network segment including network access information of a plurality of ports. The plurality of ports can be closed ports, open ports, or otherwise restricted ports. The active configuration record is compared to an expected configuration record (e.g., a pre-defined network policy) for the subscription environment. The expected configuration record can include a set of restriction rules, where the set of restriction rules generally identify IP ranges from which to allow traffic, IP ranges to be restricted, and specifically ports to be restricted and instruct (e.g., component, sequence, and priority instructions) on how the set of restriction rules are applied. A policy authoring interface can support fine grained configuration of the expected configuration, including selectively defining the set of restriction rules based on network attributes (e.g., types of protocols) with vulnerabilities that expose the computing environment to attacks. For example, the policy authoring interface can be used specify the set of restrictions rules for a selected IP range corresponding to a selected port and protocol combination (e.g., port 3389 on TCP or port 3389 on UDP).

When the security maintenance manager determines the active configuration record does not include restrictions found in the expected configuration record, the security maintenance manager modifies the active configuration record based on the expected configuration record. In particular, the set of restriction rules can be accessed so that the active configuration is modified based on the set of restriction rules. A calculated set of ports are identified from the plurality of ports of the network segment for applying the set of restriction rules. The calculated set of ports are a set of ports from the expected configuration record that are less restrictive than a set of ports of the active configuration record (e.g., if an NSG does not already allow traffic a port, but the policy allows traffic, the port is not included). The set of restriction rules are applied to the calculated set of ports to restore a permitted network configuration for the network segment.

The operations of the security maintenance manager ("security maintenance operations") and additional functional components are executed as an algorithm or sequenced steps of instructions for performing the specific functions for access management with a security maintenance mechanism. In this way, the security maintenance operations can quickly correct errors in network policies, when a network policy associated with a network segment is not approved for the network segment or for the network. The security maintenance operations further support implementing access management mechanisms to ensure consistent security maintenance (i.e., security automation, keeping malicious users out, and exerting control over potential risky users within an organization) for different types of subscriptions and resources in a distributed computing environment while limiting overhead and human intervention in access management of computing resources in distributed computing environments. Additional aspects of the technical solution are described below, by way of exemplary implementations, with reference to technical solution environments. As such, aspects of the technical solution described in the present disclosure are directed towards improving manual maintenance of network policies in conventional systems by providing detection of unsecure network policies of an active configuration record and automatically modifying (e.g., adding missing restrictions) the active configuration record to at least restore configuration restrictions of network policies of the expected configuration record to the active configuration.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Figure 1:
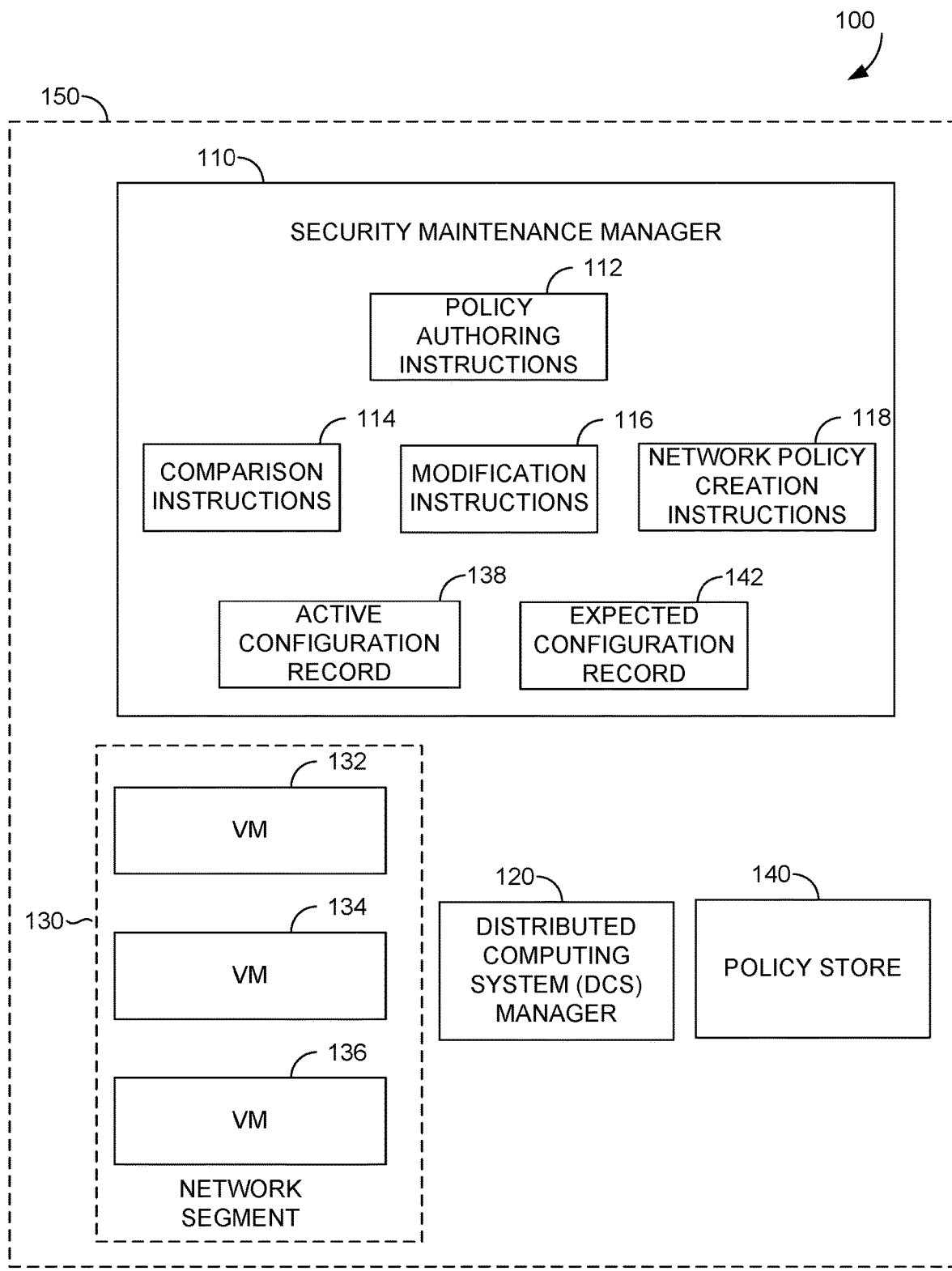
FIG. 1 is a block diagram of an example access management environment for providing security maintenance operations using a security maintenance manager, suitable for use in implementing aspects of the technology described herein

Overview of Aspects of the Technical Problem, Technical Solution, and Technological Improvement Distributed computing environments implement security mechanisms (e.g., access management systems) to ensure the security of different types of computing resources (e.g., computing access and secure user data) in the distributed computing environments. In distributed computing environments, in order to ensure security, access restrictions (e.g., network access policies) have been implemented on networks and network segments to control access to resources within the networks. Network access policies can include network access ports that may be open, closed, or restricted to traffic. Changes that affect the network segment (e.g., new access resources, adding virtual machines, or security policies) can result in an increased security risk for network owners in that they either alter or violate existing access policies. Manually maintaining network access policies for changes that affect network segments generates a significant workload for access management teams and network administrators.

Conventional access management systems that support network policies (e.g., network security groups) often lack a simplified implementation of resource policy management, in that, there exists network access policy drafting and network access policy model implementation concerns when a computing environment supports a large number of resources and network segments that can be routinely created and deployed. For example, as resources are added to a subscription, a user must make sure that the resources are properly configured (e.g., ports intended to be restricted to traffic are restricted and ports that are intended to be open to traffic are open). As more resources are added to a subscription, the task of configuring resources to align with established network access policies becomes increasingly more difficult to manage. For example, subscribers to a distributed computing environment may have deployment codes (or templates) that are out-of-date, as such the deployment codes do not have the most up-to-date network segment restrictions. When a network segment (e.g., virtual network) is created with these deployment codes, the network segment will lack the most up-to-date network policies of the distributed computing environment.

Moreover, a subscription defined for a distributed computing environment requires subscribers to the distributed computing environment to manually control and maintain network polices for ports in network segments. Policy drafting and network policy implementation in this way raises concerns when a computing environment supports a large number (and different types) of resources and network segments that can be routinely created and deployed. For example, when many different types of users are able to create and destroy virtual resources within the subscription and connect to those resources for various computing tasks, some users may improperly configure the resource with the network policies and others may apply the network policies, leaving the virtual resource vulnerable to malicious attacks.

A user creating a resource only for temporary use may not take measures to limit access to the resource. By way of example, a user may create a virtual machine to work on a project and set up an open port for external access to the virtual machine while the user is working on the project. During that time, a malicious user may access the virtual machine, as the network access policy is not automatically added to the virtual machine. While the user may be able to add restrictions by changing their deployment code or templates, the additional work and overhead of adding these restrictions causes many users not to take action. As such, on a large scale, it can be difficult for a subscription administrator to manage the security configurations for these short-lived resources and many subscription administrators do not take action to secure these resources due to the added work and overhead of properly configuring the resources with the network access policies. In this way, there are limited mechanisms or safeguards in conventional access management systems for maintaining a minimum acceptable level of security on network segments while allowing for changes to be made to the network segments. As such, an alternative approach for providing access management that can provide automated security with consistent application of network access policies to resource instances and network segments in computing environments would improve computing operations for more secure and efficient application of network access policies.

Embodiments of the present invention are directed to simple and efficient methods, systems, and computer storage media for providing detection of unsecure network policies in a network segment and automatically remediating the unsecure policies based on pre-defined network policies in a distributed computing environment. In particular, a security maintenance manager of an access management system in the computing environment detects an unsecure network policy based on comparing an active configuration record of the network segment to an expected configuration record of the network segment and modifies the active configuration to at least restore network policies of the expected configuration to the active configuration.

In operation, a security maintenance manager accesses an active configuration record and an expected configuration record of a network segment of a subscription environment in the distributed computing environment. A network segment can generally refer to a physical or logical division of an IP network, for example, a subnet where a set of computers belong to the subnet and have IP addresses associated with the subnet. The network segment can include a network firewall (e.g., a system for monitoring and controlling incoming and outgoing network traffic based on a set of network policies or rules) for the subscription environment. The active configuration record can be automatically accessed periodically based on a pre-defined time period. The pre-defined time period can be the same or different from different types of subscription environments in the distributed computing environment. Each subscription can have a corresponding security maintenance manager that supports maintaining a set of pre-defined network policies having restrictions for ports in the network segment. The network segment can support different types of network ports that allow access to the resources of the subscription environment, such as internet management ports (e.g., remote desktop (RDP) or secure shell access (SSH)).

The active configuration record for the network segment is dynamically retrieved from the distributed computing environment. The active configuration record can specifically include network policies that include network security groups of the subscription environment associated with the network segment. The expected configuration record can be retrieved from a policy store. The expected configuration record can include network policies (e.g., pre-defined or baseline network policies) of the distributed computing environment including one or more Internet Protocol (IP) ranges to be restricted and one or more port to be restricted. A policy authoring interface can support fine grained configuration of the expected configuration, including selectively defining the set of restriction rules based on network attributes (e.g., types of protocols) with vulnerabilities that expose the computing environment to attacks. For example, a first protocol (e.g., TCP) may expose a subscription environment to connection-based attacks, while a second protocol (e.g., UDP) may expose the subscription to message-based attacks. The expected configuration can be flexibly configured to define an attribute of a vulnerability of a network segment and specifically configure the set of restrictions rules for evaluating and restoring the attribute to a configuration that would limit exposure to malicious users.

By way of example, the policy authoring interface can be used to specify the set of restriction rules for a selected IP range corresponding to a selected port and protocol combination (e.g., port 3389 on TCP or port 3389 on UDP). The set of restriction rules can be processed differently based on the type of protocol associated with a port. The set of restriction rules are applied to the active configuration based on the active configuration having a protocol attribute associated with a restriction rule in the set of restriction rules. The set of restriction rules can be in a format that can be understood or processed via the security maintenance manager to implement the specifications (e.g., component, sequence, priority instructions) defined in the set of restriction rules associated with the expected configuration record.

It is contemplated that the security maintenance manager can filter out network policies associated with virtual network interface cards (virtual NIC, or VNIC) because the virtual network interface card can inherit one or more restrictions applied to the network segment. For example, if any one subnet NSG or NIC NSG blocks traffic, the traffic gets blocked. The security maintenance manager further determines that a restriction of a port in an expected configuration record is missing from the active configuration record based on comparing the active configuration record to the expected configuration record. In particular, adding the one or more restrictions on the ports is based on applying a set of restriction rules to the active configuration records. The set of restriction rules can generally instruct on IP ranges from which to allow traffic, IP ranges to be restricted, or specifically ports to be restricted. For example, the set of restriction rules can include configuring the network segment to exclusively allow traffic from within the corresponding network segment, exclusively allow traffic from a corresponding network traffic management device and exclusively allow traffic from identified IP ranges while blocking all other IP ranges, to the calculated set of ports. The set of restriction rules can generally define a pattern for remediating network policies of an unsecure network segment; however the examples described herein are not meant to be limiting. The network traffic management device can specifically be a load balancer that supports routing client request across servers, usually in a manner that maximizes speed and capacity utilization to ensure balanced performance. The set of restriction rules are applied to a calculated set of ports. The calculated set of ports are a set of ports from the expected configuration record that are less restrictive than a set of ports of the active configuration record. Applying the set of restriction rules to the calculated set of ports allows for modifying the active configuration record without reducing a more restrictive subscription network policy in the one or more subscription network policies of the active configuration record. For example, the active configuration record can include one or more subscription environment network policies and the expected configuration record comprises one or more Internet Protocol (IP) ranges to be restricted and one or more ports to be restricted. The set of restriction rules are applied to the calculated set of ports to exclusively allow traffic from within the corresponding network segment, from a corresponding load balance, and one or more identified IP ranges. The set of restriction rules are prioritized (i.e., rules are added to the top in order of priority) over existing rules in the active configuration record. Adding the one more restrictions can also include creating new network policies for the active configuration record.

By way of example, the set of restriction rules can specifically include a first rule that instructs to allow traffic associated with a calculated set of ports to an identified Internet Protocol (IP) range; a second rule that instructs to allow traffic associated with the calculated set of ports within the network segment; a third rule that instructs to allow traffic associated with the calculated set of ports from a network traffic management device; and a fourth rule to allow deny all traffic associated with the calculated set of port from all remaining IP ranges. The security maintenance manager applies any identified set of restriction rules to modify the active configuration record based on adding one or more restrictions on one or more ports of the active configuration record. The security maintenance manager communicates instructions to initialize the modified active configuration record on the network segment. As such, the security maintenance manager can implement access management mechanisms to ensure security and limit human intervention for computing resources in distributed computing environments.

Figure 2:
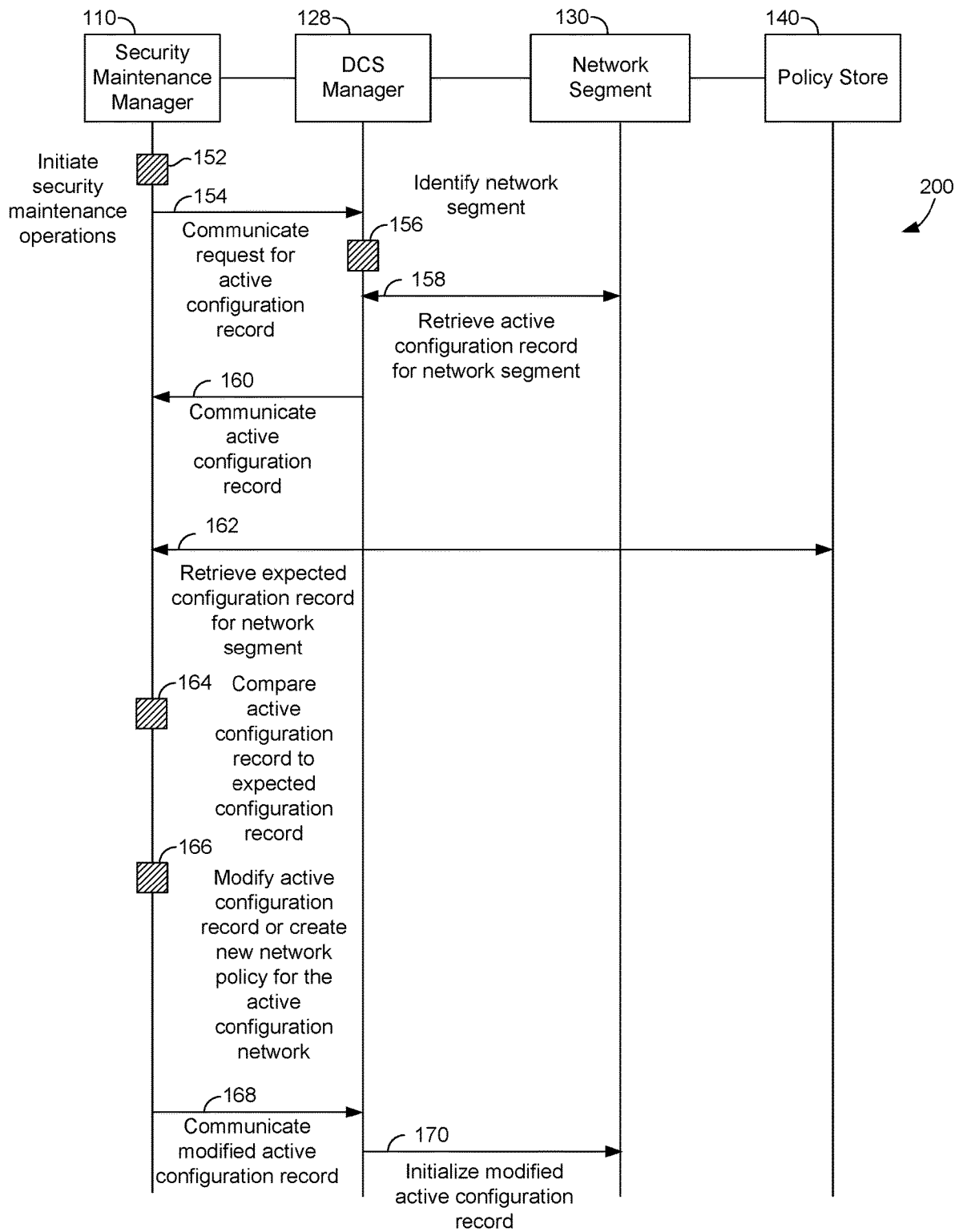
FIG. 2 is an example access management environment for providing security maintenance operations in accordance with aspects of the technology described herein.

Overview of Example Environments for Providing Security Maintenance Operations using a Security Maintenance Manager Aspects of the technical solution can be described by way of examples and with reference to FIG. 1 and FIG. 2. FIG. 1 and FIG. 2 are associated with an exemplary technical solution environment (access management environment 100) suitable for use in implementing embodiments of the technical solution. Generally, the technical solution environment includes a technical solution system suitable for providing security maintenance operations based on a security maintenance manager. With initial reference to FIG. 1, FIG. 1 discloses access management environment 100, subscription environment 150, security maintenance manager 110, policy authoring instructions 112, comparison instructions 114, modification instructions 116, network policy creation instructions 118, distributed computing system (DCS) manager 120, virtual machine set including VM 132, VM 134, VM 136, active configuration record 138, expected configuration record 142, network segment 130, and policy store 140.

At a high level, a network segment in a computing environment (e.g., access management environments 100) is owned (i.e., managed) by a tenant in a subscription environment 150. The tenant can segment a virtual network into one or more sub-networks (e.g., network segments) 130 and allocate a portion of the virtual network address space to each segment. The tenant can further deploy, destroy, and/or modify resources (e.g., virtual machine 132) within the network segment. By deploying resources within a network segment, the tenant can secure resources within the network segment based on network policies (e.g., access management configuration rules, network security groups, network policies, and network access polices) associated with the network segment. For example, a tenant may apply network policies to a VM within a network segment 130 or to the network segment 130 itself. If the tenant applies the network policies to the network segment, the network policies will, effectively, be applied to all resources within the network.

The security maintenance operations of the technical solution described herein supports implementing expected network policies (e.g., expected policy settings) to network segments. The security maintenance operations are implemented using a security maintenance manager (i.e., security maintenance manager 110 with policy authoring instructions 112, comparison instructions 114, modification instructions 116, network policy creation instructions 118) that supports security maintenance operations that are executed to determine access security risks caused by inconsistent network policies and apply approved network policies for network segments within a network of the distributed computing environment.

The security maintenance manager identifies inconsistent network policies. In particular, after a predefined period of time, the security maintenance manager accesses the most up to date Application Programming Interface (API) for the distributed computing environment by making a call to the DCS manager 120 that is owned by the distributed computing environment for the most up to date API. The most up to date API is called to ensure no backwards compatibility issues arise due to an outdated API. Using the distributed computing environment API, the security maintenance manager accesses a tenant subscription 150 to retrieve active network security configuration information (e.g., active configuration record 138) for network segments within the subscription. Network security configuration information includes a list of active network segments in the subscription that are associated with resources.

Further, the configuration information includes an active configuration record 138 associated with the network segment ("active configuration record"), which includes details of the active network policies. For example, the active configuration record may include details on rules for which ports are open to traffic, which IP addresses are allowed to communicate with those ports and which internet protocols are permitted (e.g., TCP or UDP). The rules govern conduct, actions, procedures, and arrangements for traffic to the network segments. For example, a rule may allow traffic through port 22 and port 33 if the traffic is transmitted via TCP and is from a given IP range. The active configuration record may include zero rules or may contain as many rules as are allowed by the distributed computing environment.

Additionally, after the predefined period of time, the security maintenance manager accesses the policy store 140 via a security maintenance manager API to retrieve expected network policies (e.g., expected configuration record 142). The expected network policies are intended to apply to all resources within the subscription. While a network segment or a resource within a network segment may include rules that are more restrictive than the expected configuration rules, these rules are meant to establish a minimum level of acceptable security for resources and network segments within the subscription.

The policy authoring instructions 112 support fine grained configuration of the expected configuration, including selectively defining the set of restriction rules be based on network attributes (e.g., types of protocols) with vulnerabilities that expose the computing environment to attacks. The policy authoring instructions include support for specifying ports to restrict for certain IP ranges. In particular, a policy author interface is presented such that, for example, an administrator can identify an IP range and select a port and protocol combination for the IP range such that one or more rules are created in the set of restriction rules in the expected configuration record. The expected configuration can be stored and retrieved when the security maintenance manager is performing comparison operations for an active configuration record.

The comparison instructions 114 supports, for a given network segment, identifying a set of ports (i.e., a calculated set of ports) on which a set of restriction rules are applied. The differences between the active configuration record and the expected configuration record may be identified by comparing the port values, IP range values and internet protocol values in the active configuration record against the expected configuration record. The comparison instructions may identify the calculated set of ports based on determining a port value included in the active configuration record is also included in the expected configuration record. In particular, a calculated set of ports are identified, where the calculated set of ports are a set of ports from the expected configuration record that are less restrictive than a set of ports of the active configuration record (e.g., if an NSG does not already allow traffic a port, but the policy allows traffic, the port is not included).

By way of example, the active configuration record may include ports 22, 33, 100, 200, and 236, while the expected configuration record may include ports 22, 55, 100, 236, and 520. Based on common port values found in the active configuration record and the expected configuration record, ports 22, 100, and 236 would be considered calculated set of ports. Based on the determined calculated set of ports, IP range values for the active configuration record and the expected configuration record may be compared to determine whether the active configuration record includes IP values for a port in the calculated set of ports which are not found in the expected configuration record. An IP value found in the active configuration record that is not found in the expected configuration record would indicate that communication is allowed through a port in the calculated set of ports on the network segment which is not allowed by the subscription policy (e.g., by the expected configuration record).

The modification instructions 116 supports modifying the active configuration record 138 based on determined inconsistencies between the active configuration record and the expected configuration record. In particular, the active configuration record may include ports that do not include restrictions (e.g., IP range, protocol type, schedule, or application) found in the expected configuration record. For example, the active configuration record may show that port 22 is open to all IP addresses, whereas the expected configuration record may show that port 22 should be restricted to a specific IP range. In such instances, the security maintenance manager may remediate the active configuration record to include those restrictions found in the expected configuration record that are not found in the active configuration record. Further, the modification instructions support implementing a set of restriction rules are applied to the calculated set of ports. The set of restriction rules can generally instruct on IP ranges from which to allow traffic, IP ranges to be restricted, or specifically ports to be restricted. The set of restriction rules may be prioritized over existing network policies in the active network configuration.

The network policy creation instructions 118 supports creating new security rules (e.g., policies or list of policies) that can allow, deny and/or restrict network traffic to resources included in a virtual network or network segment. For example, the security maintenance manager may determine, based on the comparison instructions, that the active configuration record for a network segment does not include rules to allow, deny, and/or restrict network traffic to resources within the network segment. In particular, the security maintenance manager can, using the network policy creation instructions, create new security rules for a network segment.

As such, security maintenance manager provides reliable policy application on network segments of computing environments based on the security maintenance operations. Conventional access management systems did not have such a simplified implementation of resource policy management because of historical and legacy implementations, which now cannot adequately support the policy implementation demands, especially for large scale tenant subscriptions with multiple resources.

With reference to FIG. 2, FIG. 2 also discloses access management environment that supports the functionality of the technical solution. The access management environment can have corresponding features and functionality as access management system 100 described herein with reference to FIG. 1.

Initially at step 152, the security maintenance manager initiates security maintenance operations. At step 154, the security maintenance manager 110 can communicate a request, for an active configuration record of a network segment, to the DCS manager 120. At block 156 and step 158, the DCS manager can identify at least one network segment and can retrieve an active configuration record for the network segment. For example, the actual configuration record may include details on which of the network segment ports are open to traffic and which IP addresses are permitted to communicate via those ports. At step 160, the DCS manager can communicate the active configuration record to the security maintenance manager. At step 162, the security maintenance manager can retrieve an expected configuration record for the network segment. The expected configuration record is authored based on policy authoring instructions that include support for specifying ports to restrict for certain IP ranges. In particular, a policy author interface is presented such that an administrator can identify an IP ranges and select a port and protocol combination for the IP range. One or more rules are created in the set of restrictions rules is created as part of the expected configuration record. The expected configuration can be stored and retrieved when the security maintenance manager is performing comparison operations for the active configuration record.

At block 164, the security maintenance manager, using comparison instructions, can compare the active configuration record to the expected configuration record. At block 166, the security maintenance manager, using modification instructions, can modify the active configuration record or, using network policy creation instructions, create a new network policy for the active configuration record. At step, 168, the security maintenance manager can communicate the modified active configuration record to the DCS manager. At step 170, the DCS manager can initialize the modified active configuration record to the network segment. In the event there is an error initializing the modified active configuration record to the network segment, the security maintenance manager can detect the error and can reinitialize the modified active configuration record to the network segment.

Aspects of the technical solution of this disclosure have been described with reference to several inventive features and advantages associated the security maintenance manager. Security maintenance manager provides security maintenance operations that are executed to determine access security risks caused by inconsistent network policies and apply approved network policies for network segments within a network of the distributed computing environment. The security maintenance operations can help correct errors in policies, where a policy associated with a network segment is not approved for the network segment or for the network. Overall, the practical application of aspects of the technical solution described results in improvements based on less CPU computation, smaller memory requirements, increased automation and increased flexibility in access management systems.

Figure 3:
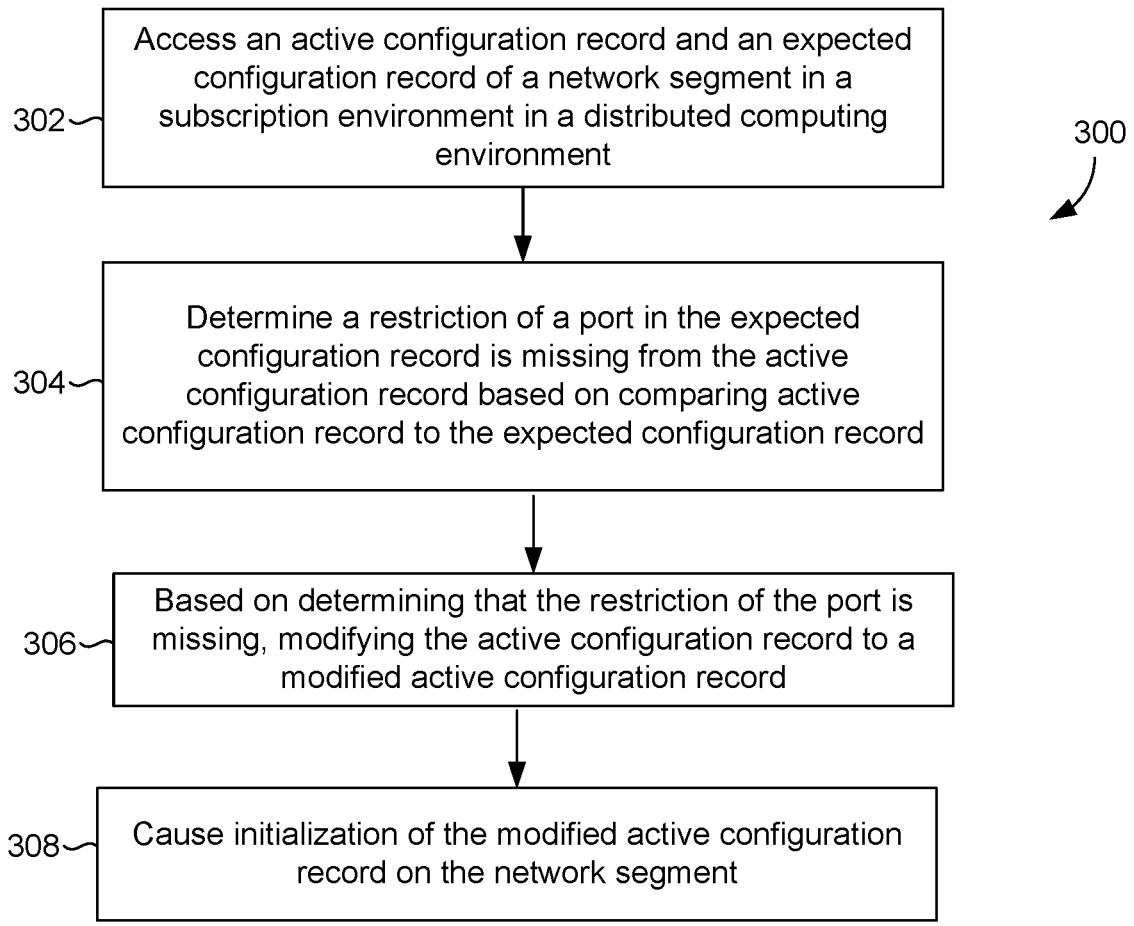
FIG. 3 provides a first example method of providing security maintenance operations, in accordance with aspects of the technology described herein.
Figure 4:
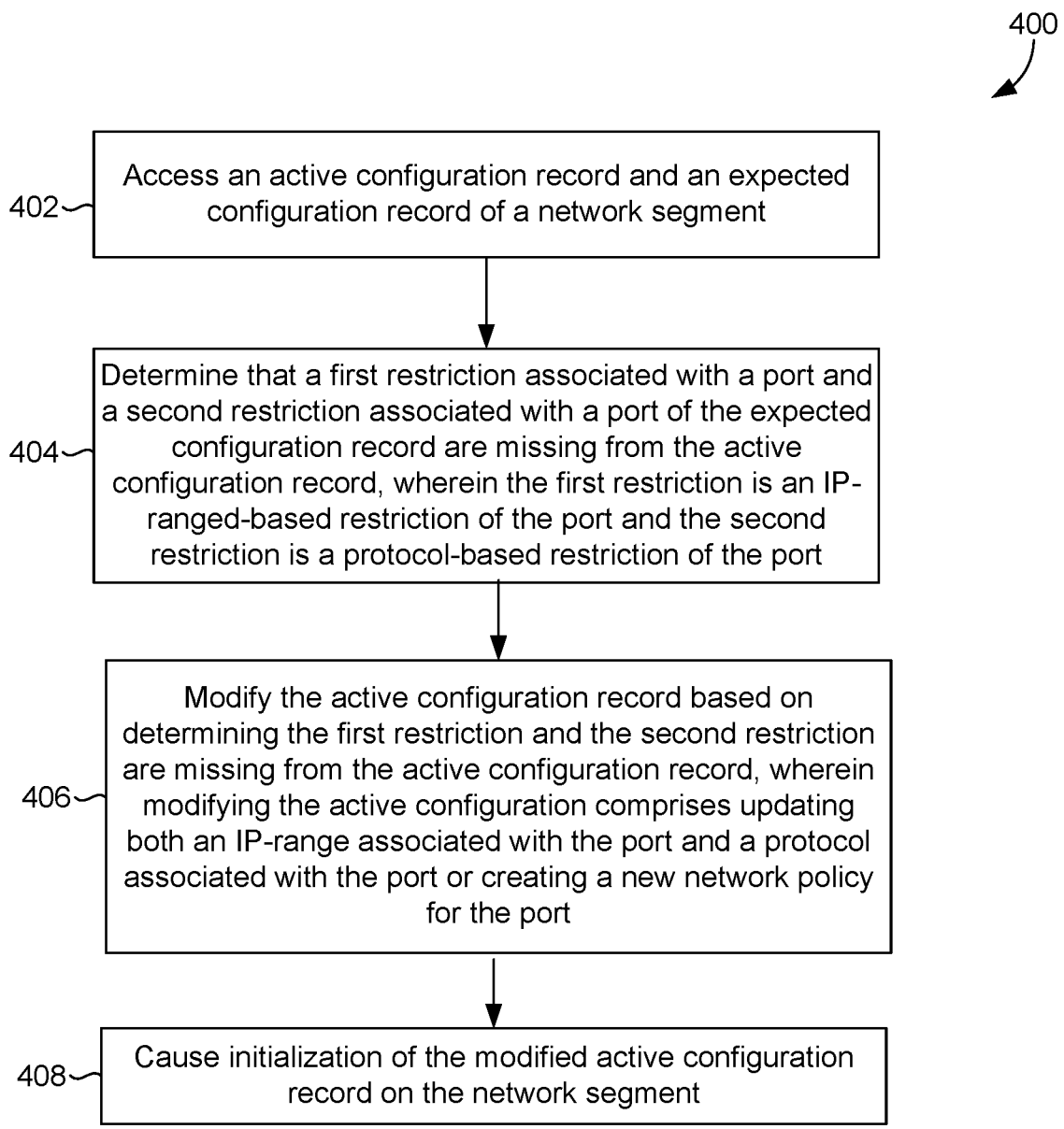
FIG. 4 provides a second example method of providing security maintenance operations, in accordance with aspects of the technology described herein.
Figure 5:
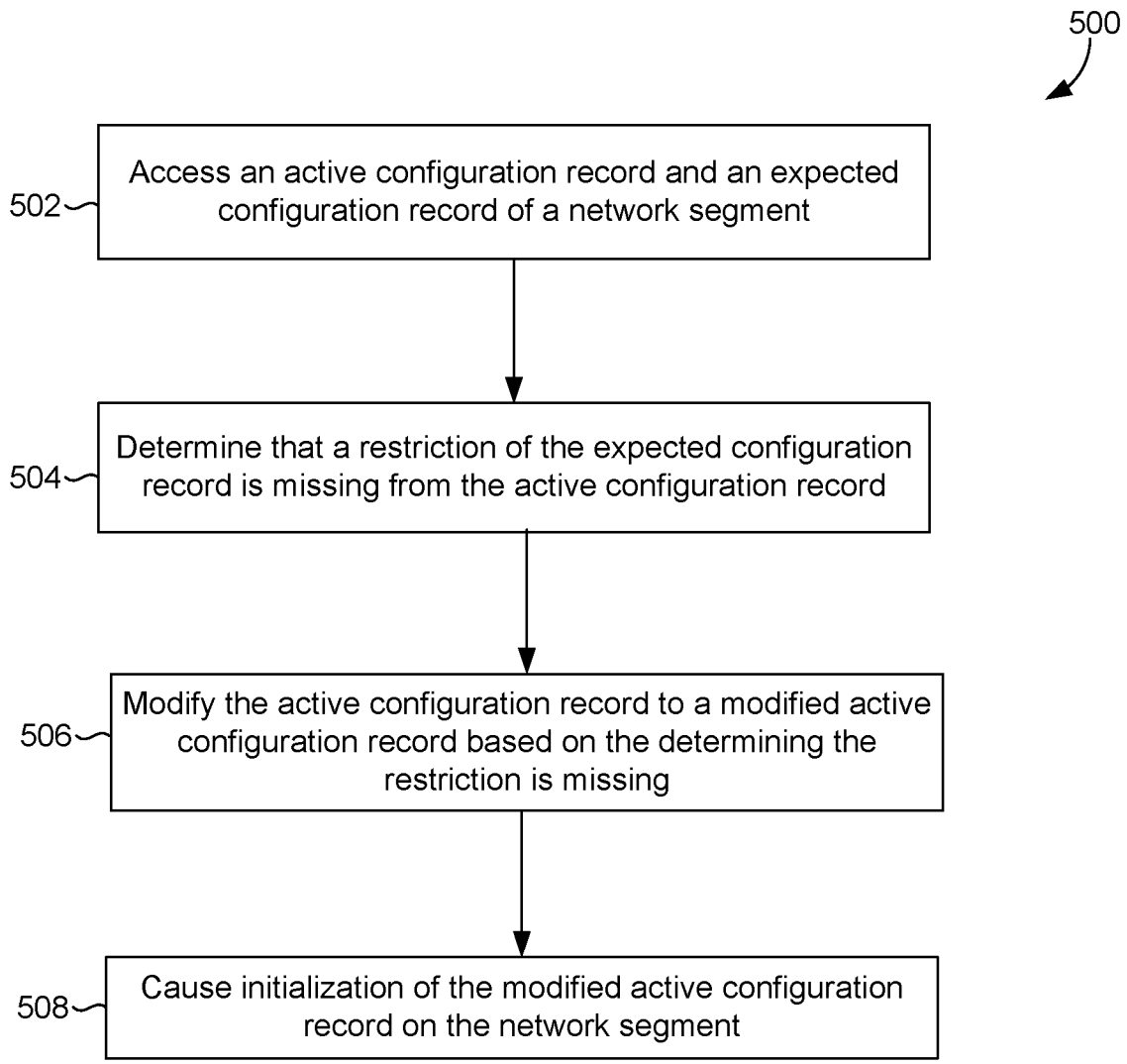
FIG. 5 provides a third example method of providing security maintenance operations, in accordance with aspects of the technology described herein.

Example Methods for Providing Access Management based on Security Maintenance Operations With reference to FIGS. 3, 4 and 5, flow diagrams are provided illustrating methods for providing access management based on security maintenance operations. The methods may be performed using the access management environment described herein. In embodiments, one or more computer storage media having computer-executable instructions embodied thereon that, when executed, by one or more processors can cause the one or more processors to perform the methods in the storage system.

Turning to FIG. 3, a flow diagram is provided that illustrates a method 300 for providing security maintenance operations. Initially, at block 302, an active configuration record and an expected configuration record of a network segment in a subscription environment in a distributed computing environment are accessed. At block 304, a restriction of a port in the expected configuration record is determined to be missing from the active configuration record based on comparing active configuration record to the expected configuration record. At block 306, the active configuration record is modified based on determining that the restriction of the port is missing. At block 308, the modified active configuration record is initialized on the network segment.

Turning to FIG. 4, initially, at block 402, an active configuration record and an expected configuration record of a network segment in a subscription environment in a distributed computing environment are accessed. At block 404, a first restriction associated with a port and a second restriction associated with the port of the expected configuration record are determined to be missing from the active configuration record. The first restriction is an IP-ranged-based restriction of the port and the second restriction is a protocol-based restriction of the port. At block 406, the active configuration record is modified based on determining the first restriction and the second restriction are missing from the active configuration record, wherein modifying the active configuration comprises updating both an IP-range associated with the port and a protocol associated with the port or creating a new network policy for the port. At block 408, the modified active configuration record is initialized on the network segment.

Turning to FIG. 5, initially, at block 502, an active configuration record and an expected configuration record of a network segment are accessed. At block 504, a restriction of the expected configuration record is determined to be missing from the active configuration record. At block 506, the active configuration record is modified based on determining the restriction is missing. At block 508, the modified active configuration record is initialized on the network segment.

Example Distributed Computing Environment

Figure 6:
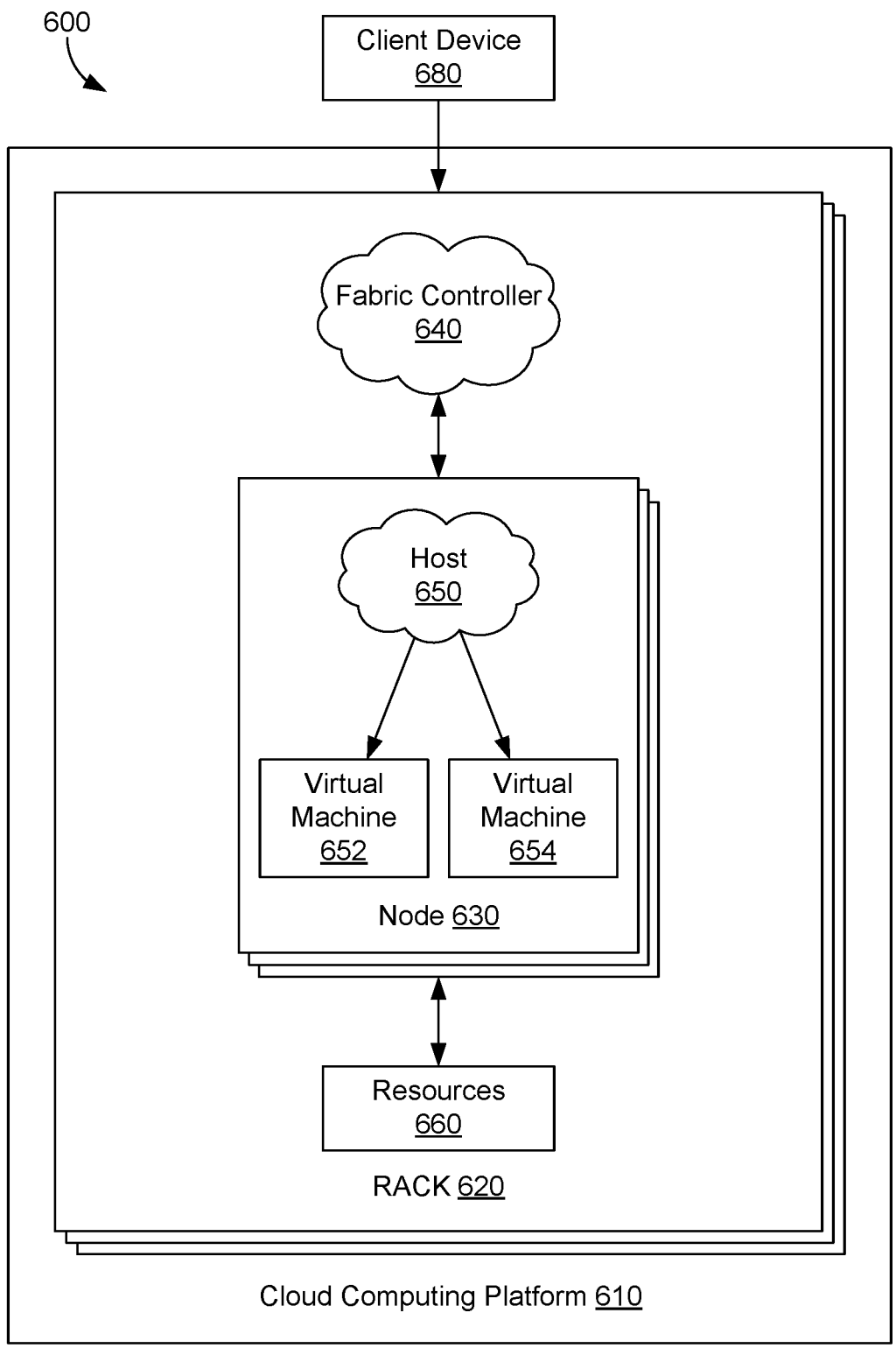
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 700 described with reference to FIG. 7, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Operating Environment

Figure 7:
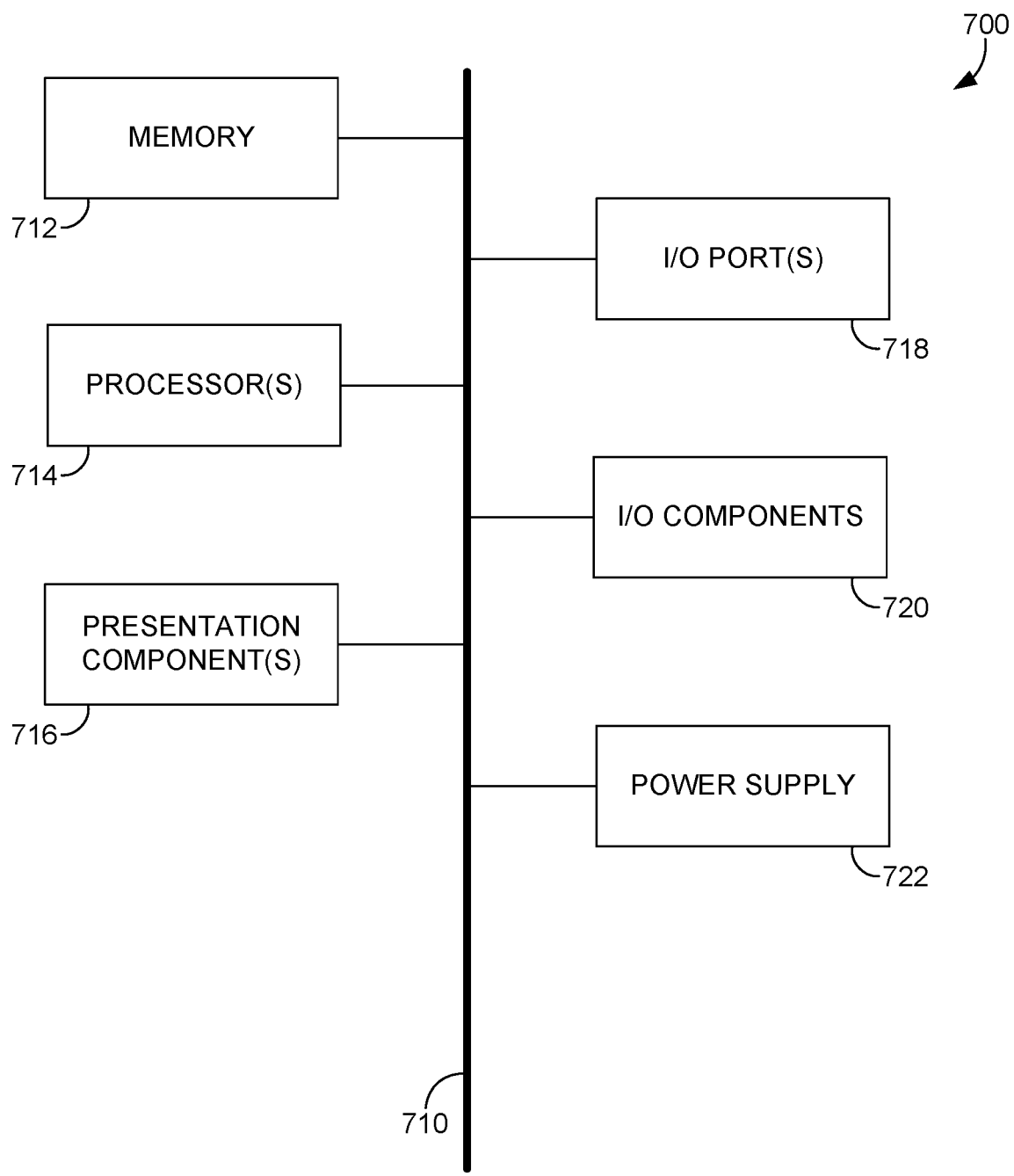
FIG. 7 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an Application Programming Interface (API) library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code.

Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
one or more computer processors; and
computer memory storing computer-useable instructions that, when used by the one or more computer processors, cause the one or more computer processors to perform operations comprising:
accessing an active configuration record and an expected configuration record of a network segment of a subscription environment in a distributed computing environment, wherein the expected configuration record is associated with a set of restriction rules for allowing and restricting Internet Protocol (IP) traffic;
determining that a restriction of a port in the expected configuration record is missing from the active configuration record based on comparing the active configuration record to the expected configuration record, wherein the port is in a calculated set of ports based on identifying the port in a set of ports of the expected configuration record and a set of ports of the active configuration record, and wherein the set of ports of the expected configuration record are less restrictive than the set of ports of the active configuration record;
based on determining that the restriction of the port is missing, modifying the active configuration record to a modified active configuration record based on, applying the set of restrictions rules comprising allowing pre-defined network policy communications via the port and adding one or more restrictions on the port; and
causing initialization of the modified active configuration record on the network segment.

2. The system of claim 1, wherein the network segment comprises a virtual network firewall for the subscription environment, wherein the subscription environment is one of a plurality of subscription environments in the distributed computing environment, wherein the plurality of subscription environments are associated with corresponding security maintenance managers that support maintaining a set of pre-defined network policies comprising restrictions for internet-exposed management ports.

3. The system of claim 1, the operations further comprising filtering out one or more network policies associated with virtual network interface cards in the network segment, wherein a virtual network interface card inherits one or more restrictions applied to the network segment.

4. The system of claim 1, wherein the active configuration record comprises one or more subscription network policies, wherein the expected configuration record comprises one or more Internet Protocol (IP) ranges to be restricted and one or more ports to be restricted based on the set of restriction rules, and wherein the set of restriction rules instruct on how to implement IP ranges from which to allow traffic and IP ranges to be restricted.

5. The system of claim 1, wherein adding the one or more restrictions is based on creating one or more new network policies for the active configuration record.

6. The system of claim 1, wherein the set of ports of the expected configuration record contains fewer ports than the set of ports in the active configuration record such that modifying the active configuration record is less restrictive based on fewer ports in the calculated set of ports than the set of ports of the active configuration record.

7. The system of claim 1, wherein the set of restriction rules are defined in the expected configuration record, wherein a rule in the set of restriction rules is configurable based with a selected Internet Protocol (IP) range and a corresponding selected port and protocol combination.

8. One or more computer-storage media having computer-executable instructions embodied thereon that, when executed by a computing system having a processor and memory, cause the processor to:
  access an active configuration record and an expected configuration record of a network segment of a subscription environment in a distributed computing environment, wherein the expected configuration record is associated with a set of restriction rules for allowing and restricting Internet Protocol (IP) traffic;
  determine that a restriction of a port in the expected configuration record is missing from the active configuration record based on comparing the active configuration record to the expected configuration record, wherein the port is in a calculated set of ports based on identifying the port in a set of ports of the expected configuration record and a set of ports of the active configuration record, and wherein the set of ports of the expected configuration record are less restrictive than the set of ports of the active configuration record;
  based on determining that the restriction of the port is missing, modify the active configuration record to a modified active configuration record based on, applying the set of restrictions rules comprising allowing pre-defined network policy communications via the port and adding one or more restrictions on the port; and
  cause initialization of the modified active configuration record on the network segment.

9. The media of claim 8, wherein the network segment comprises a virtual network firewall for the subscription environment, wherein the subscription environment is one of a plurality of subscription environments in the distributed computing environment, wherein the plurality of subscription environments are associated with corresponding security maintenance managers that support maintaining a set of pre-defined network policies comprising restrictions for internet-exposed management ports.

10. The media of claim 8, wherein the instructions further comprise filtering out one or more network policies associated with virtual network interface cards in the network segment, wherein the virtual network interface card inherit one or more restrictions applied to the network segment.

11. The media of claim 8, wherein the active configuration record comprises one or more subscription network policies, wherein the expected configuration record comprises one or more Internet Protocol (IP) ranges to be restricted and one or more ports to be restricted based on the set of restriction rules, and wherein the set of restriction rules instruct on how to implement IP ranges from which to allow traffic and IP ranges to be restricted.

12. The media of claim 8, wherein adding the one or more restrictions is based on creating one or more new network policies for the active configuration record.

13. The media of claim 8, wherein the set of ports of the expected configuration record contains fewer ports than the set of ports in the active configuration record such that modifying the active configuration record is less restrictive based on fewer ports in the calculated set of ports than the set of ports of the active configuration record.

14. The media of claim 8, wherein the set of restriction rules are defined in the expected configuration record, wherein a rule in the set of restriction rules is configurable based with a selected Internet Protocol (IP) range and a corresponding selected port and protocol combination.

15. A computer-implemented method, the method comprising:
  accessing an active configuration record and an expected configuration record of a network segment of a subscription environment in a distributed computing environment, wherein the expected configuration record is associated with a set of restriction rules for allowing and restricting Internet Protocol (IP) traffic;
  determining that a restriction of a port in the expected configuration record is missing from the active configuration record based on comparing the active configuration record to the expected configuration record, wherein the port is in a calculated set of ports based on identifying the port in a set of ports of the expected configuration record and a set of ports of the active configuration record, and wherein the set of ports of the expected configuration record are less restrictive than the set of ports of the active configuration record;
  based on determining that the restriction of the port is missing, modifying the active configuration record to a modified active configuration record based on, applying the set of restrictions rules comprising allowing pre-defined network policy communications via the port and adding one or more restrictions on the port; and
  causing initialization of the modified active configuration record on the network segment.

16. The method of claim 15, the method further comprising:
  filtering out one or more network policies associated with virtual network interface cards in the network segment, wherein the virtual network interface card inherit one or more restrictions applied to the network segment.

17. The method of claim 15, wherein the active configuration record comprises one or more subscription network policies, wherein the expected configuration record comprises one or more Internet Protocol (IP) ranges to be restricted and one or more ports to be restricted based on the set of restriction rules, and wherein the set of restriction rules instruct on how to implement IP ranges from which to allow traffic and IP ranges to be restricted.

18. The method of claim 15, wherein adding the one or more restrictions is based on creating one or more new network policies for the active configuration record.

19. The method of claim 15, wherein the set of ports of the expected configuration record contains fewer ports than the set of ports in the active configuration record such that modifying the active configuration record is less restrictive based on fewer ports in the calculated set of ports than the set of ports of the active configuration record.

20. The method of claim 15, wherein the set of restriction rules are defined in the expected configuration record, wherein a rule in the set of restriction rules is configurable based with a selected Internet Protocol (IP) range and a corresponding selected port and protocol combination.

\* \* \* \* \*